United States Patent
Gunn et al.

(10) Patent No.: US 7,084,094 B2
(45) Date of Patent: Aug. 1, 2006

(54) PROCESS FOR ALTERING THE RELATIVE PERMEABILITY IF A HYDROCARBON-BEARING FORMATION

(75) Inventors: Alistair Manson Gunn, Reading (GB); James Charles Morgan, Yateley (GB)

(73) Assignee: TR Oil Services Limited, Aberdeen (GB)

( * ) Notice: Subject to any disclaimer, the term of this patent is extended or adjusted under 35 U.S.C. 154(b) by 152 days.

(21) Appl. No.: 10/169,360

(22) PCT Filed: Dec. 21, 2000

(86) PCT No.: PCT/GB00/04929

§ 371 (c)(1),
(2), (4) Date: Oct. 8, 2002

(87) PCT Pub. No.: WO01/49971

PCT Pub. Date: Jul. 12, 2001

(65) Prior Publication Data

US 2003/0109385 A1    Jun. 12, 2003

Related U.S. Application Data

(60) Provisional application No. 60/173,510, filed on Dec. 29, 1999.

(51) Int. Cl.
*C09K 8/58* (2006.01)
*C09K 8/588* (2006.01)
*E21B 43/16* (2006.01)

(52) U.S. Cl. ............... 507/237; 507/221; 507/224; 507/225; 507/235; 507/238

(58) Field of Classification Search ............... 507/221, 507/224, 225, 235, 237, 238
See application file for complete search history.

(56) References Cited

U.S. PATENT DOCUMENTS

| | | | |
|---|---|---|---|
| 3,749,172 A * | 7/1973 | Hessert et al. ............ 166/400 |
| 3,949,811 A | 4/1976 | Threlkeld et al. ............ 166/294 |
| 4,120,361 A | 10/1978 | Threlkeld et al. ............ 166/294 |
| 4,290,485 A * | 9/1981 | Free et al. ............ 166/281 |
| 4,460,751 A | 7/1984 | Hanlon et al. ............ 525/371 |
| 4,488,975 A | 12/1984 | Almond ............ 252/8.55 |
| 4,524,829 A | 6/1985 | Hanlon et al. ............ 166/294 |
| 4,606,772 A | 8/1986 | Almond et al. ............ 106/208 |
| 4,617,132 A | 10/1986 | Dalrymple et al. ............ 252/8.554 |
| 4,679,625 A | 7/1987 | Gibbons ............ 166/270 |
| 4,693,310 A | 9/1987 | Gibbons ............ 166/270 |
| 4,799,550 A | 1/1989 | Harris et al. ............ 166/300 |
| 4,959,163 A | 9/1990 | Holtmyer et al. ............ 252/8.551 |
| 4,982,793 A | 1/1991 | Holtmyer et al. ............ 166/305.1 |
| 5,067,565 A | 11/1991 | Holtmyer et al. ............ 166/305.1 |
| 5,122,549 A | 6/1992 | Holtmyer et al. ............ 523/130 |
| 5,133,408 A | 7/1992 | Tackett ............ 166/270 |
| 5,147,644 A | 9/1992 | Oppenlaender et al. ............ 424/401 |
| 5,161,615 A | 11/1992 | Hutchins et al. ............ 166/295 |
| 5,304,620 A | 4/1994 | Holtmyer et al. ............ 527/310 |
| 5,346,339 A | 9/1994 | Himes et al. ............ 405/171 |
| 5,363,916 A | 11/1994 | Himes et al. ............ 166/276 |
| 5,413,178 A | 5/1995 | Walker et al. ............ 166/300 |
| 5,439,057 A | 8/1995 | Weaver et al. ............ 166/295 |
| 5,558,161 A | 9/1996 | Vitthal et al. ............ 166/280 |
| 5,617,920 A * | 4/1997 | Dovan et al. ............ 166/295 |
| 5,642,783 A | 7/1997 | Moradi-Araghi et al. ............ 166/295 |
| 5,669,446 A | 9/1997 | Walker et al. ............ 166/300 |
| 5,669,447 A | 9/1997 | Walker et al. ............ 166/300 |
| 5,680,900 A | 10/1997 | Nguyen et al. ............ 166/295 |
| 5,701,956 A | 12/1997 | Hardy et al. ............ 166/295 |
| 5,762,140 A | 6/1998 | Hardy et al. ............ 166/295 |
| 5,762,141 A * | 6/1998 | Hutchins et al. ............ 166/295 |
| 5,789,350 A | 8/1998 | Moradi-Araghi et al. ... 507/203 |
| 5,950,731 A | 9/1999 | Shuchart et al. ............ 166/300 |
| 6,169,058 B1 | 1/2001 | Le et al. ............ 507/222 |
| 6,228,812 B1 | 5/2001 | Dawson et al. ............ 507/221 |

FOREIGN PATENT DOCUMENTS

EP    0 604 988 A2    7/1994
GB    2 334 539 A    8/1999

* cited by examiner

*Primary Examiner*—Jeffrey B. Robertson
(74) *Attorney, Agent, or Firm*—Drinker Biddle & Reath LLP; Daniel A. Monaco

(57) ABSTRACT

A process for treating a hydrocarbon-bearing formation having at least one hydrocarbon bearing zone and at least one water bearing zone wherein the ratio of the permeability of the hydrocarbon bearing zone(s) to the permeability of the water bearing zone(s) is in the range of from 1:20 to 3:1 comprising: a) sequentially injecting into the formation: (i) an aqueous polymer solution comprising 0.01 to 0.5 weight percent of a water-soluble polymer having from 0.01 to 7.5 mole % of crosslinkable carboxylate and/or phosphonate groups and a molecular weight in the range of 250,000 to 12,000,000; and (ii) an aqueous solution of a crosslinking agent; and b) back-producing the aqueous polymer solution over the crosslinking agent so that the polymer crosslinks within the formation to form a gel which is collapsible to allow hydrocarbon flow.

19 Claims, No Drawings

PROCESS FOR ALTERING THE RELATIVE PERMEABILITY IF A HYDROCARBON-BEARING FORMATION

This is a 371 of PCT/GB00/04929, filed Dec. 21, 2000 and published in English on Jul. 12, 2001, which in turn claims the benefit of U.S. provisional patent application Ser. No. 60/173,510, filed Dec. 29, 1999, abandoned.

The present invention relates to a process for altering the permeability of hydrocarbon-bearing subterranean formations.

According to U.S. Pat. No. 5,547,025, it is well known to those skilled in the art that gelled or crosslinked water-soluble polymers are useful in enhanced oil recovery and other oil field operations. In particular, they have been used to alter the permeability of underground formations in order to enhance the effectiveness of water flooding operations. Generally, polymers along with an appropriate crosslinking system are injected in an aqueous solution into the formation. The polymers then permeate into and gel in the regions of the formation having the highest water permeability. Specifically, the process of U.S. Pat. No. 5,547,025 comprises injecting into a formation a gelling composition which comprises a carboxylate-containing polymer, a crosslinking agent and a liquid wherein the gelling composition forms a gel when injected into the formation. Such gelling compositions are conventionally deployed in a subterranean formation where water bearing regions of the formation have substantially higher water permeability than oil bearing regions so that the polymers substantially permeate into and gel in the water bearing regions of the formation. Indeed, there is a prejudice against using crosslinked polymers in formations where oil bearing regions have a high permeability to the injected aqueous solution because of concerns that the polymer may gel in the oil bearing regions and shut-off oil production. In such cases, it has generally been considered essential to isolate and protect the oil bearing regions from the gelling composition thereby rendering the use of gelling compositions impractical and/or uneconomic. Reference to isolation and protection of oil bearing zones is made, for example, by R Fulleylove et al in Society of Petroleum Engineers (SPE) 36211; Proceedings of $7^{th}$ Abu Dhabi International Petroleum Exhibition, by J Bergem et al in SPE 38833, and by K S Chan et al in SPE36614.

EP 0 604 988 describes a composition that is useful for near-wellbore treatment in oil field operations which comprises a produced brine, a water-soluble polymer, a crosslinker, and optionally a complexing ligand. The near-wellbore treatment is said to include water shut-off, gas shut-off and zone abandonment. According to EP 0 604 988, the water-soluble polymer, crosslinker and complexing ligand can be injected sequentially without special order of injection, as long as they are first dissolved in the produced brine. However, it has now been found that if the crosslinker is injected before the polymer that the treatment will be unsuccessful since the polymer will crosslink before it can propagate into the formation owing to the presence of residual crosslinker (for example, as little as 2 ppm of crosslinker) in the surface injection equipment and in the wellbore. A further disadvantage associated with injecting an aqueous solution of crosslinker before an aqueous solution of the polymer is that the hydrocarbon bearing zone of the formation frequently has a pressure lower than that of the water bearing zone and hence a higher permeability. Without wishing to be bound by any theory, it is believed that, where the hydrocarbon bearing zone has a significantly higher permeability than the water bearing zone, any aqueous solution which is injected into the formation will, at least initially, predominately enter the lower pressure hydrocarbon bearing zone. However, as the aqueous solution enters the hydrocarbon bearing zone the pressure of this zone will build up. As the pressure differential between the hydrocarbon and water bearing zones decreases a higher proportion of the injected aqueous solution will enter the water bearing zone. Since the aqueous solution of polymer has a significantly higher viscosity than the aqueous solution of crosslinker, the pressure in the hydrocarbon bearing zone will increase more rapidly if the aqueous solution of polymer is injected before the aqueous solution of crosslinker. This results in a higher proportion of the injected solutions entering the water bearing zone and hence an increased effect on reducing water production from the water-bearing zone.

U.S. Pat. No. 5,789,350 discloses a gelling composition comprising a carboxylate-containing polymer, a multivalent metal compound, a liquid and a pH lowering agent selected from carbon dioxide, carbon dioxide-generating compounds, weak acids and esters wherein the gelling composition does not contain a gelation delaying agent.

U.S. Pat. No. 5,133,408 relates to injecting a gel precursor solution comprising a carboxylate-containing polymer, a gelling agent and a liquid solvent into a subterranean formation.

U.S. Pat. No. 5,642,783 describes injecting a gelling composition into a subterranean formation wherein the composition comprises a carboxylate-containing polymer, a crosslinking agent and a liquid; the crosslinking agent does not contain a gelation delaying agent, and the polymer contains an effective mole % of carboxylate groups and an effective molecular weight to effect the delaying of gelation of the composition.

According to the present invention, there is provided a process for treating a hydrocarbon-bearing formation having at least one hydrocarbon bearing zone and at least one water bearing zone wherein the ratio of the permeability of the hydrocarbon bearing zone(s) to the permeability of the water bearing zone(s) is in the range of from 1:20 to 3:1 which process comprises:

a) sequentially injecting into the formation:
   (i) optionally an aqueous pre-flush fluid;
   (ii) an aqueous polymer solution comprising 0.01 to 0.5 weight percent of a water-soluble polymer having from 0.01 to 7.5 mole % of crosslinkable carboxylate and/or phosphonate groups and a molecular weight in the range of 250,000 to 12,000,000;
   (iii) optionally an aqueous spacer fluid;
   (iv) an aqueous solution of a crosslinking agent; and
   (v) optionally an overflush fluid; and
b) back-producing the aqueous polymer solution over the crosslinking agent so that the polymer crosslinks within the formation to form a gel which is collapsible to allow hydrocarbon flow.

By "gel" is meant a collapsible network of polymer and crosslinking agent.

By mole % of crosslinkable carboxylate and/or phosphonate groups is meant the mole % of structural units of the polymer which are derived from monomers having carboxylate functional groups, and/or from monomers having phosphonate functional groups and/or from monomers having functional groups which are hydrolysed to carboxylate groups (upon dissolution of the polymer in water).

An advantage of the process of the present invention is that the process can be applied to a formation without having to isolate or otherwise protect the hydrocarbon bearing zone from the injected solutions/fluids.

Polymers suitable for use in this invention are those capable of gelling in the presence of a polyvalent metal ion crosslinking agent via carboxylate and/or phosphonate groups.

Suitable polymers include the various polyacrylamides and related polymers which are partially hydrolysed and which are water-soluble, such as those disclosed in U.S. Pat. No. 3,749,172 and EP 0 604 988 (herein incorporated by reference). Examples of suitable polymers include the homopolymers and copolymers of acrylamide and methacrylamide wherein from 0.01 to 7.5 mole % of the carboxamide groups of the polymer are hydrolysed to carboxylate groups. Also, suitable are water-soluble copolymers resulting from the polymerisation of acrylamide and/or methacrylamide with another ethylenically unsaturated monomer copolymerisable therewith, wherein sufficient acrylamide and/or methacrylamide is present in the monomer mixture to impart water-solubility to the resulting copolymer, and wherein from 0.01 to 7.5% of the carboxamide groups of the copolymer are hydrolysed to carboxylate groups. The ethylenically unsaturated monomer which is copolymerisable with the acrylamide and/or methacrylamide may be selected from the group consisting of acrylic acid, methacrylic acid, vinyl sulfonic acid, vinylbenzylsulfonic acid, vinylbenzenesulfonic acid, vinyl acetate, acrylonitrile, methyl acrylonitrile, vinyl alkyl ether, vinyl chloride, maleic anhydride, N-vinyl-2-pyrrolidone, 2-acrylamido-2-methylpropanesulfonic acid, N-vinyl-2-pyrrolidone, N-vinyl formamide, and the like. It is to be understood that where the copolymer additionally contains carboxylate groups derived from acrylic acid and/or methacrylic acid comonomer, the total amount of carboxylate groups in the resulting copolymer (i.e. carboxylate groups arising from the acrylic acid and/or methacrylic acid comonomer and carboxylate groups arising from the partial hydrolysis of the carboxamide groups of the acrylamide and/or methacrylamide comonomer) lies within the range 0.01 to 7.5 mole %. It is also to be understood that anionic functional groups in the copolymers (for example, acrylate or sulfonate functional groups) may be in the form of salts, for example, ammonium or alkali metal salts, particularly sodium salts.

Preferred polymers contain crosslinkable phosphonate groups, for example, polymers which incorporate phosphonic acid monomers. Particularly preferred are copolymers of vinyl phosphonic acid monomers and acrylamide, copolymers of vinyl phosphonic acid monomers and methacrylamide or copolymers of vinyl phosphonic acid monomers, acrylamide and methacrylamide. These copolymers may also incorporate one or more further comonomers selected from the group consisting of acrylic acid, methacrylic acid, vinyl sulfonic acid, vinylbenzylsulfonic acid, vinylbenzenesulfonic acid, vinyl acetate, acrylonitrile, methyl acrylonitrile, vinyl alkyl ether, vinyl chloride, maleic anhydride, N-vinyl-2-pyrrolidone, 2-acrylamido-2-methylpropanesulfonic acid, N-vinyl-2-pyrrolidone, N-vinyl formamide, and the like. It is to be understood that the total mole % of crosslinkable groups in the copolymer (i.e. phosphonate groups derived from the vinyl phosphonic acid comonomer, carboxylate groups derived from acrylic acid and/or methacrylic acid comonomer and carboxylate groups arising from partial hydrolysis of the carboxamide groups of the acrylamide and/or methacrylamide comonomer) lies within the range 0.01 to 7.5 mole %. It is also to be understood that the anionic functional groups which are incorporated into the copolymer (for example, phosphonate, acrylate or sulfonate functional groups) may be in the form of salts, for example, ammonium or alkali metal salts, particularly sodium salts.

Also suitable are graft copolymers of hydrophilic polymers and phosphonates as disclosed in U.S. Pat. No. 5,701,956 which is herein incorporated by reference. For example, the hydrophilic polymer may be selected from polyacrylamides, polymethacrylamides, partially hydrolysed polyacrylamide, partially hydrolysed polymethacrylamide, copolymers containing acrylamide, copolymers containing methacrylamide, hydroxyalkylcelluloses, guar gum and derivatives thereof and other similar hydrophilic polymers. The term "phosphonate" is used herein to mean phosphonic acid monomers and polymers including vinyl phosphonic acid monomers. The total amount of phosphonate groups and of any carboxylate groups incorporated in the graft copolymer is generally in the range 0.01 to 7.5 mole %. It is to be understood that the phosphonate groups of the graft copolymer may be in the form of salts, for example, ammonium or alkali metal salts, particularly sodium salts.

The above polymers may incorporate additional functional groups in order to improve other properties such as their solubility or thermal stability.

The mole percent of carboxylate and/or phosphonate groups in the water-soluble polymer is generally in the range of from 0.01 to 7.5%. It is preferred that the mole percent of carboxylate and/or phosphonate groups is in the range of 0.01 to 5, preferably 0.01 to 2, and most preferably 0.5 to 2%.

The number average molecular weight of the water-soluble polymer is generally in the range of 250,000 to 12,000,000, preferably in the range 500,000 to 10,000,000, more preferably 1,000,000 to 5,000,000, for example, about 3,000,000.

The concentration of the water-soluble polymer in the aqueous polymer solution is generally in the range of about 0.01 to 0.5 weight percent, preferably about 0.05 to 0.4 weight percent, more preferably 0.05 to 0.35 weight percent, for example, 0.15 to 0.35 weight percent. A relatively low concentration of polymer is advantageous since this mitigates the risk of a rigid blocking gel being formed as the polymer solution is backproduced over the crosslinking agent. Thus, without wishing to be bound by any theory, it is believed that by using a relatively low concentration of polymer, the rate of gelation within the porous formation is reduced such that the polymer is capable of propagating through the region of the formation containing the crosslinking agent, thereby generating a three dimensional network of crosslinked polymer (gel) throughout at least a substantial part of said region, preferably, substantially throughout said region.

The crosslinked polymer (gel) is collapsible to allow hydrocarbon flow, in particular, oil or gas flow. Preferably, the crosslinked polymer collapses (contracts) by at least 50% by volume, more preferably by at least 75% by volume, most preferably by at least 90% by volume in the presence of flowing hydrocarbon, for example, flowing oil or gas.

Preferably, the collapsed crosslinked polymer is capable of re-expanding in the presence of flowing water to reduce water flow. Suitably, the collapsed crosslinked polymer is capable of re-expanding by at least 25% by volume, preferably, by at least 50% by volume in the presence of flowing water.

Preferably, the aqueous polymer solution contains a buffering agent. Preferably, the buffering agent has a buffering capacity at a pH of up to about 5.5, preferably in a pH range of 4.5 to 5.5. A typical buffering agent is sodium acetate/acetic acid.

Where the aqueous polymer solution contains a buffering agent, the concentration of buffering agent will be dependent on the type of buffering agent employed and the buffering capacity of the rock formation. Generally, it is preferred that the buffering agent is present at a concentration in the range 0.001 to 10% by weight, preferably 0.01 to 1% by weight (based on the weight of the aqueous polymer solution).

The aqueous polymer solution may optionally incorporate a mutual solvent (conditioner) for at least partially removing hydrocarbons (for example, oil) from the surface of the formation rock. Without wishing to be bound by any theory it is believed that this improves anchorage of the crosslinked polymer (gel) to the surface of the formation rock. Suitably, the mutual solvent may be an alcohol or preferably a polyol such as an alkyltriglycol ether. The alkyl group of the alkyltriglycol ether may be straight or branched chain and suitably has 3–6 carbon atoms, preferably 3–5 carbon atoms. The alkyl group in the alkyltrigycol ether more preferably has 4 carbon atoms and is especially n-butyltriglycol ether (also known as triethylene glycol mono-n-butyl ether). Preferably, the mutual solvent comprises from 1 to 20% by weight, preferably from 5 to 15% by weight, more preferably from 5 to 12% by weight of the aqueous polymer solution.

Preferably, the crosslinking agent is selected from the group consisting of complexed zirconium compounds, complexed titanium compounds, and mixtures thereof. Examples of suitable crosslinking agents include, but are not limited to, ammonium zirconium fluoride, zirconium 2-ethylhexanoate, zirconium acetate, zirconium neodecanoate, zirconium acetylacetonate, tetrakis(triethanolamine)zirconate, zirconium carbonate, ammonium zirconium carbonate, zirconyl ammonium carbonate, zirconium complex of hydroxyethyl glycine, zirconium malonate, zirconium propionate, zirconium lactate, zirconium tartrate, titanium acetylacetonate, titanium ethylacetoacetate, titanium triethanolamine, ammonium titanium lactate and combinations thereof. These compounds are commercially available. Preferably, the crosslinking agent is a zirconium lactate of formula $[CH_3CH(OH)CO_2]_n X_m Zr$ wherein X is an monovalent anion, for example, a halide (chloride, bromide, iodide or fluoride) or hydroxide, m and n are integers such that m+n=4 and n is 1 to 4, preferably 3 or 4. It is also envisaged that the lactate ligands of the zirconium compound of the above formula may be replaced, in whole or in part, by ligands derived from a carboxylic acid e.g. acetic acid or by ligands derived from hydroxyacids other than lactic acid. Such hydroxy acids include monohydroxy acids, hydroxyacids containing more than one hydroxyl group, for example dihydroxyacids and trihydroxyacids, and hydroxyacids containing more than one carboxyl group, for example hydroxydicarboxylic acids and hydroxytricarboxylic acids. Mixtures of ligands derived from hydroxyacids may be employed. Where the zirconium complex contains ligands derived from a hydroxytricarboxylic acid (for example, citrate), it is essential that the compound does not contain four of such ligands.

The concentration of crosslinking agent in the aqueous solution may vary over a broad range of from 0.001 to 0.5 weight percent based on zirconium and/or titanium concentration. The concentration of crosslinking agent is preferably in the range of 0.01 to 0.25 weight percent, more preferably 0.025 to 0.2 weight percent, most preferably 0.025 to 0.15 weight percent based on zirconium and/or titanium concentration.

Preferably, the aqueous solution of the crosslinking agent contains a buffering agent. Preferably, the buffering agent has a buffering capacity at a pH of up to about 5.5, preferably in a pH range of 4.5 to 5.5. A typical buffering agent is that described above in relation to the aqueous polymer solution. Generally, it is preferred that the buffering agent is present in the aqueous solution of the crosslinking agent at a concentration in the range 0.001 to 10% by weight, preferably 0.01 to 1% by weight Without wishing to be bound by any theory, it is believed that not all of the injected crosslinking agent will be available to crosslink the water-soluble polymer. Thus, a portion of the crosslinking agent may be produced out of the well on back-production of the injected solutions/fluids while a further portion of the crosslinking agent may deactivate under the conditions within the formation. Preferably, the concentration of crosslinking agent which is available to crosslink the water-soluble crosslinkable polymer is less than 0.01 weight percent of the aqueous fluids within the region of the formation containing the crosslinking agent, based on zirconium and/or titanium.

The water which is to be used to prepare the aqueous polymer solution and the aqueous solution of the crosslinking agent may be pure water, tap water, seawater, a synthetic brine or a produced brine.

Suitably, the optional aqueous spacer fluid may be an aqueous solution of a buffering agent. Preferably, the buffering agent has a buffering capacity at a pH of up to about 5.5, preferably in a pH range of 4.5 to 5.5. A typical buffering agent is that described above in relation to the aqueous polymer solution. Where the optional aqueous spacer fluid is an aqueous solution of a buffering agent, it is preferred that the buffering agent is present in a concentration in the range 0.001% to 10% by weight, preferably 0.1 to 1% by weight.

The optional aqueous spacer fluid may incorporate a mutual solvent (conditioner). Suitable mutual solvents include those described above in relation to the aqueous polymer solution. Preferably, the mutual solvent comprises from 1 to 20% by weight, preferably from 5 to 15% by weight, more preferably from 5 to 12% by weight of the optional aqueous spacer fluid.

The optional overflush fluid may be an aqueous fluid or a non-aqueous fluid (e.g. the hydrocarbon which is produced from the hydrocarbon bearing zone). Advantages associated with using an overflush fluid include reducing the usage of the crosslinking agent and reducing, or even eliminating, back-production of excess crosslinking agent. Where the optional overflush fluid is a non-aqueous fluid, this may also reduce the time for the hydrocarbon flow rate to recover to pre-treatment levels.

Depending on the type of well, it may be advantageous to inject an aqueous pre-flush fluid prior to injecting the aqueous polymer solution. This aqueous pre-flush fluid is injected in order to cool and/or kill the well (as would be evident to the person skilled in the art).

Suitably, the aqueous pre-flush fluid may incorporate a mutual solvent (conditioner). Suitable mutual solvents include those described above in relation to the aqueous polymer solution. Preferably, the mutual solvent comprises from 1 to 20% by weight, preferably from 5 to 15% by weight, more preferably from 5 to 12% by weight of the optional aqueous pre-flush fluid.

The water which is used for the optional aqueous preflush fluid, the optional aqueous spacer fluid and the optional overflush fluid may be pure water, tap water, seawater, a synthetic brine or a produced brine.

The volumetric ratio of the aqueous polymer solution to the aqueous solution of the crosslinking agent is generally 0.01:1 to 100:1, preferably 0.02:1 to 50:1, and most preferably 0.1:1 to 10:1.

The volumetric ratio of the aqueous polymer solution to the optional aqueous spacer fluid is typically 50:1 to 1:10 and preferably 20:1 to 1:2.

The volumetric ratio of the optional overflush fluid to the aqueous solution of crosslinking agent is typically 1:50 to 50:1 and preferably 1:25 to 25:1. This volumetric ratio is based on the amount of the overflush fluid which enters the formation (i.e. does not take into account the amount of overflush fluid present in the wellbore).

The volumetric ratio of the optional aqueous pre-flush fluid to the aqueous polymer solution is typically 1:10 to 2:1.

In a typical treatment, an aqueous pre-flush fluid (for example, a brine or fresh water) may first be injected (from a surface injection facility) into the formation. An aqueous polymer solution is then injected (also from the injection facility) at a rate and polymer concentration sufficient to raise the injection pressure by a desired amount. Alternatively, methods known in the art for directing or diverting injected fluids may be employed, such as, injection of materials to reduce "lost circulation" or the use of ball seals (for blocking perforations in the tubing at selected depths within the wellbore). The total volume of injected aqueous polymer solution per foot of completed interval will be dependent upon the type of well and the distribution of the hydrocarbon bearing zone(s) and water bearing zone(s) within the formation.

Preferably, an aqueous spacer fluid is then injected from the injection facility. The amount of the aqueous spacer fluid should be sufficient to ensure that significant mixing of polymer and crosslinking agent does not occur in the injection facility or in the wellbore. If necessary (depending on the type of formation rock and the chemistry of the solutions/fluids—as may be examined by core flood or sandpack performance tests), a buffering agent/conditioner is added to the aqueous spacer fluid and/or the aqueous polymer solution.

An aqueous solution of the crosslinking agent is then injected (from the injection facility) into the formation so that the front of this solution travels several feet out from the wellbore (typically 3 ft or more). If deemed necessary, an aqueous overflush fluid (for example, a brine or fresh water) is injected to push the front of the injected aqueous solution of crosslinking agent a further distance out from the wellbore. Thus, the final position of the front of the aqueous solution of crosslinking agent may be up to 100 ft, for example 15 to 50 ft from the wellbore.

For a vertical or a slanted well, in a reservoir having hydraulically separated hydrocarbon and water producing layers, the final position of the front of the injected aqueous polymer solution, after all of the solutions/fluids have been injected, need be no more than about 5 ft from the wellbore. However, it is evident that the final position of the front of the injected aqueous polymer solution will be dependent upon the amounts of optional aqueous spacer fluid, aqueous solution of crosslinking agent and optional overflush fluid injected into the formation.

The well may then be shut-in for a short period of time of up to 24 hours before the well is put back on production. The injected solutions/fluids will then travel back towards the wellbore. As the solutions flow back towards the well bore, the water-soluble polymer will contact at least a portion of the active crosslinking agent thereby forming a gel in situ within the formation. The gel is collapsible to allow hydrocarbon flow and is believed to be anchored to the surface of the rock formation.

Although not essential, the well may be shut in for a short period of time when the polymer is in the region of the formation containing the crosslinking agent. Preferably, the well is shut in for at least 4 hours, for example 4 hours to 1 week when the polymer is in the region of the formation containing the crosslinking agent.

In the process of the present invention, the injected solutions/fluids may enter a hydrocarbon bearing zone of the formation. When the well is put back on production, there may be some initial reduction of hydrocarbon flow from the hydrocarbon bearing zone. However, as the aqueous treatment solutions/fluids gradually return to the wellbore, they are replaced by hydrocarbon. The gel (crosslinked polymer) collapses when contacted with the hydrocarbon thereby allowing the hydrocarbon to flow freely into the wellbore. However, if an aqueous formation fluid subsequently enters the hydrocarbon bearing zone, the contracted crosslinked polymer is capable of expanding to reduce water flow. Without wishing to be bound by any theory, it is believed that the rate of flow of water through the gel (in either its non-contracted state or in its re-expanded state) is significantly lower than the rate of flow of hydrocarbon through the gel. Thus, the net result of the treatment method of the present invention is an increase in the ratio of the produced hydrocarbon rate to the produced water rate which has an advantage in reducing the cost of disposal of the produced water. A further advantage of the treatment method of the present invention is that in some cases the drawdown in the well may be increased (since the proportion of hydrocarbon in the produced fluids in the wellbore will be higher than before the treatment of the present invention) and hence the hydrocarbon flow rate is increased.

The process of the present invention is illustrated by the following examples.

EXAMPLE 1

Aqueous Solution of Crosslinking Agent

An aqueous solution of a zirconium lactate crosslinking agent was prepared by reacting $ZrOCl_2.8H_2O$ (0.141 g) with lactic acid (0.136 g of 88% solution) made up to 20 ml volume with deionised water, so as to provide a lactate:zirconium stoichiometric ratio of 3:1 and a concentration of crosslinking agent of 2000 ppm (based on zirconium). The pH of the solution was then adjusted to 4.8 with dilute ammonia solution. This was done by adding 12 ml of ammonia solution (320 microlitres of concentrated ammonia solution made up to 12 ml with deionised water) and then 8 ml of deionised water, giving a final concentration of 1000 ppm based on zirconium.

Polymer

The polymer used was Hostamer V3212 (a polymer having crosslinkable phosphonate groups) supplied by Clariant GmbH.

Synthetic Sea Water

The synthetic sea water was a sea water corrosion test mixture supplied by BDH Laboratory Supplies, Poole, Dorset UK (product number 331533P; conforming to DEF1053/B.S.3900/B.S.2011).

Preparation of Sandpack

A stainless steel tube (5 ft long, ⅜ inch outer diameter, ¼ inch inner diameter) was dry packed with sand (80% D sand mixed with 20% E sand as supplied by David Ball PLC, Bar Hill, Cambridge CB38HN, UK). This sandpack was then heated to a temperature of 70° C., and the air in the sandpack was displaced with about one pore volume of carbon dioxide. The absolute permeability of the sandpack was determined using synthetic sea water, introduced at a flow rate of 1.0 ml/minute, as 9.14 Darcy.

Crude oil mixed with 15% by mass toluene was then introduced at a constant flow rate of 1.0 ml/minute until the pressure of the sandpack stabilised, followed by synthetic sea water at a flow rate of 1.0 ml/minute, again until the pressure stabilised. At this point the permeability of the sandpack was measured as 3.40 Darcy to water at the Residual Oil Saturation to Waterflood ($S_{orw}$).

After this conditioning of the sandpack, the treatment was commenced.

Treatment (at 70° C.)

Day 1

20 ml (just over 1 pore volume) of a 2000 ppm solution of polymer in synthetic seawater was introduced at a flow rate of 20 ml/hour. 20 ml of synthetic sea water spacer was then introduced at a flow rate of 20 ml/hour. This was followed by 20 ml of the 1000 ppm aqueous solution of crosslinking agent (prepared as described above), also at a flow rate of 20ml/hour. At this point the sand-pack was shut-in overnight at a temperature of 70° C.

Day 2

To simulate back-production of the polymer over the crosslinking agent, 20 ml of synthetic sea water (equal to the spacer) was first flowed through the sandpack (in the reverse direction from that used to inject the aqueous polymer solution, synthetic sea water spacer and aqueous solution of crosslinking agent) at a rate of 20 ml/hour. 20 ml of the 2000 ppm aqueous polymer solution was then back-flowed (again in the reverse direction) at a rate of 20 ml/hour. The sandpack was then shut-in again overnight at a temperature of 70° C.

Sea Water/Oil Back-flow (at 70° C.)

Sea water was first back-flowed through the sandpack at a rate of 6 ml/hour. After 1 day the residual resistance factor to water ($RRF_w$) was measured as 92. $RRF_w$ refers to the pressure gradient to water flow observed at a given water flow rate after treatment divided by the pressure gradient to water flow observed before treatment at the same water flow rate. After 3 days the RRF, was measured as 108.

Back-flow was then switched to crude oil mixed with 15% by mass of toluene (at a rate of 6 ml/hour). After 3 days flow the residual resistance factor to oil ($RRF_o$) was measured as 1.75. $RRF_o$ refers to the pressure gradient to oil flow observed at a given oil flow rate after treatment divided by the pressure gradient to oil flow observed before treatment at the same oil flow rate.

The high RRF to water and relatively low RRF to oil clearly demonstrate the effectiveness of the treatment method in modifying the relative permeability of the sandpack.

EXAMPLE 2

Crosslinking Agent

The crosslinking agent used was CL-23 (zirconium based) supplied by Halliburton Energy Services.

Polymer

The polymer used was Hostamer V3212 (a polymer having crosslinkable phosphonate groups) supplied by Clariant GmbH.

Synthetic Brine

A synthetic brine was prepared by dissolving the following chemicals in deionised water, made up to a final volume of 1 litre: 33.65 g NaCl, 0.242 g KCl, 7.65 g $MgCl_2.6H_2O$, 3.83 g $CaCl_2.6H_2O$, and 0.276 gm $NaHCO_3$.

pH Adjusted Synthetic Brine

For this, the pH of the above synthetic brine was adjusted to a value of 4.6 using a 1M solution of HCl.

Buffer

A solution containing 0.1 M acetic acid and 0.073 M sodium acetate was made up in deionised water.

Preparation of Sandpack

A stainless steel tube (15 ft long, ⅜ inch outer diameter, ¼ inch inner diameter) was dry packed with sand (80% D sand mixed with 20% E sand as supplied by David Ball PLC, Bar Hill, Cambridge CB38 HN, UK). This sandpack was then heated to a temperature of 70° C., and the air in the sandpack was displaced with about one pore volume of carbon dioxide. The absolute permeability of the sandpack was determined using synthetic brine, introduced at a flow rate of 1 ml/min, as 10.13 Darcy.

Crude oil mixed with 15% by mass toluene was then introduced at a constant flow rate of 1 ml/minute until the pressure of the sandpack had stabilised, followed by synthetic brine at a flow rate of 1.0 ml/minute, again until the pressure stabilised. At this point the permeability of the sandpack was measured as 3.46 Darcy to water at the Residual Oil Saturation to Waterflood ($S_{orw}$).

After this conditioning of the sandpack, the treatment was commenced

Treatment (at 70° C.)

Day 1

19 ml of a 3000 ppm solution of polymer in pH adjusted synthetic brine was introduced at a flow rate of 20 ml/hour. 5 ml of spacer (40% by mass of the acetate buffer in pH adjusted synthetic brine) was then introduced at a flow rate of 20 ml/hour. This was followed by 19 ml of a solution of crosslinking agent (1.43% by mass of CL-23 and 40% by mass of the acetate buffer, in pH adjusted synthetic brine), also at a flow rate of 20 ml/hour. At this point the sandpack was shut-in overnight at a temperature of 70° C. The overall volume of aqueous polymer solution, spacer and aqueous solution of crosslinking agent was designed such that the entire treatment was contained within the 15 ft sandpack.

Day 2

To back-flow the polymer over the crosslinking agent, 23 ml of synthetic brine was flowed into the sandpack, in the reverse direction (to that used to inject the aqueous polymer solution, spacer and aqueous solution of crosslinking agent), at a rate of 6 ml/hour. The sandpack was then shut-in again for 3 days at a temperature of 70° C.

Water/Oil Back-flow (at 70° C.)

Synthetic brine was first back-flowed through the sandpack at a rate of 6 ml/hour. After 1 day the residual resistance factor to water ($RRF_w$) was measured as 17.

Back-flow was then switched to crude oil cut with 10% by mass of toluene (at a flow rate of 6 ml/hour). After 2 days flow the residual resistance factor to oil ($RRF_o$) was measured as 1.9.

Finally, back-flow was returned to synthetic brine at 6 ml/hour. After 1 day the $RRF_w$ was 20 and this remained constant over a period of 5 days during which flow of synthetic brine was maintained.

Thus, this example, in addition to providing further evidence of the effectiveness of the process in altering relative permeability, demonstrates that the resistance to water flow can be fully restored after collapse of the crosslinked polymer on flow of oil i.e. shows that the crosslinked polymer re-expands in the presence of flowing water.

The invention claimed is:

1. A process for treating a hydrocarbon-bearing formation having at least one hydrocarbon bearing zone and at least one water bearing zone wherein the ratio of the permeability of the hydrocarbon bearing zone(s) to the permeability of the water bearing zone(s) is in the range of from 1:20 to 3:1, which process comprises:
   a) sequentially injecting into the formation:
      (i) optionally an aqueous pre-flush fluid, the pre-flush fluid not comprising a crosslinking agent;
      (ii) before any crosslinking agent is injected, an aqueous polymer solution comprising 0.01 to 0.5 weight percent of a water-soluble polymer having from 0.01 to 7.5 mole % of crosslinkable carboxylate groups, phosphonate groups, or combination of carboxylate and phosphonate groups and a number average molecular weight in the range of 250,000 to 12,000,000;
      (iii) optionally an aqueous spacer fluid;
      (iv) an aqueous solution of a crosslinking agent. which crosslinking agent comprises a complexed zirconium compound, a complexed titanium compound or a mixture thereof; and
      (v) optionally an overflush fluid; and
   b) back-producing the aqueous polymer solution over the crosslinking agent so that the polymer crosslinks within the formation to form a gel which is collapsible to allow hydrocarbon flow.

2. A process as claimed in claim 1 wherein the water-soluble polymer has from 0.01 to 5 mole % of crosslinkable carboxylate groups, phosphonate groups, or combination of carboxylate and phosphonate groups.

3. A process as claimed in claim 2 wherein the water-soluble polymer has from 0.5 to 2 mole % of crosslinkable carboxylate groups, phosphonate groups, or combination of carboxylate and phosphonate groups.

4. A process for treating a hydrocarbon-bearing formation having at least one hydrocarbon bearing zone and at least one water bearing zone wherein the ratio of the permeability of the hydrocarbon bearing zone(s) to the permeability of the water bearing zone(s) is in the range of from 1:20 to 3:1, which process comprises:
   a) sequentially injecting into the formation:
      (i) optionally an aqueous pre-flush fluid, the pre-flush fluid not comprising a crosslinking agent;
      (ii) before any crosslinking agent is injected, an aqueous polymer solution comprising 0.01 to 0.5 weight percent of a water-soluble polymer having from 0.01 to 7.5 mole % of crosslinkable carboxylate groups, phosphonate groups, or combination of carboxylate and phosphonate groups and a number average molecular weight in the range of 250,000 to 12,000,000, wherein the polymer is selected from the group consisting of (a) copolymers of vinyl phosphonic acid monomers and acrylamide, (b) copolymers of vinyl phosphonic acid monomers and methacrylamide, (c) copolymers of vinyl phosphonic acid monomers, acrylamide and methacrylamide and (d) graft copolymers comprising a polymer selected from the group consisting of polyacrylamides, polymethacrylamides, and copolymers comprising units derived from at least one of acrylamide and methacrylamide which polymer is grafted with a phosphonate selected from the group consisting of phosphonic acid monomers and polymers having units derived from vinyl phosphonic acid monomers;
      (iii) optionally an aqueous spacer fluid;
      (iv) an aqueous solution of a crosslinking agent; and
      (v) optionally an overflush fluid; and
   b) back-producing the aqueous polymer solution over the crosslinking agent so that the polymer crosslinks within the formation to form a gel which is collapsible to allow hydrocarbon flow.

5. A process as claimed in claim 1 wherein the concentration of the water-soluble polymer in the aqueous polymer solution is in the range of 0.05 to 0.4 weight percent.

6. A process as claimed in claim 5 wherein the concentration of the water-soluble polymer in the aqueous polymer solution is in the range of 0.15 to 0.35 weight percent.

7. A process as claimed in claim 1 wherein the number average molecular weight of the water-soluble polymer is in the range of 1,000,000 to 5,000,000.

8. A process as claimed in claim 1 wherein the crosslinking agent is selected from the group consisting of ammonium zirconium fluoride, zirconium 2-ethylhexanoate, zirconium acetate, zirconium neodecanoate, zirconium acetylacetonate, tetrakis(triethanolamine)zirconate, zirconium carbonate, ammonium zirconium carbonate, zirconyl ammonium carbonate, zirconium complex of hydroxyethyl glycine, zirconium malonate, zirconium propionate, zircbnium lactate, zirconium tartrate, titanium acetylacetonate, titanium ethylacetoacetate, titanium triethanolamine, and ammonium titanium lactate.

9. A process as claimed in claim 8 wherein the crosslinking agent is a zirconium lactate of formula $[CH_3CH(OH)CO_2]_n X_m Zr$ where X is a halide or hydroxide, m and n are integers such that m+n=4 and n is 1 to 4.

10. A process as claimed in claim 1 wherein the concentration of crosslinking agent in the aqueous solution is in the range of 0.001 to 0.2 weight percent based on the concentration of zirconium, titanium, or combination of zirconium and titanium.

11. A process as claimed in claim 10 wherein the concentration of crosslinking agent available to crosslink the water-soluble polymer in the aqueous fluids within the formation is less than 0.01 weight percent based on the concentration of zirconium, titanium, or combination of zirconium and titanium.

12. A process as claimed in claim 1 wherein the gel contracts by at least 50% by volume in the presence of flowing hydrocarbon.

13. A process as claimed in claim 12 wherein the contracted gel is capable of expanding in the presence of flowing water by at least 25% by volume.

14. A process for treating a hydrocarbon-bearing formation having at least one hydrocarbon bearing zone and at least one water bearing zone wherein the ratio of the permeability of the hydrocarbon bearing zone(s) to the permeability of the water bearing zone(s) is in the range of from 1:20 to 3:1, which process comprises:
  a) sequentially injecting into the formation:
    (i) an aqueous pre-flush fluid, the pre-flush fluid not comprising a crosslinking agent;
    (ii) before any crosslinking agent is injected, an aqueous polymer solution comprising 0.01 to 0.5 weight percent of a water-soluble polymer having from 0.01 to 7.5 mole % of crosslinkable carboxylate groups. phosphonate groups, or combination of carboxylate and phosphonate groups and a number average molecular weight in the range of 250,000 to 12,000,000;
    (iii) an aqueous spacer fluid;
    (iv) an aqueous solution of a crosslinking agent; and
    (v) optionally an overflush fluid; and
  b) back-producing the aqueous polymer solution over the crosslinking agent so that the polymer crosslinks within the formation to form a gel which is collapsible to allow hydrocarbon flow;
    wherein the optional aqueous pre-flush fluid, the aqueous polymer solution, and the optional aqueous spacer solution incorporates a mutual solvent selected from an alkyltriglycol ether wherein the alkyl groups of the alkyltriglycol ether are straight chain or branched chain alkyl groups having from 3 to 6 carbon atoms.

15. A process as claimed in claim 14 wherein the mutual solvent comprises from 5 to 15% by weight of at least one of the optional aqueous pre-flush fluid, the aqueous polymer solution, and the optional aqueous spacer solution.

16. A process as claimed in claim 1 wherein at least one of the aqueous polymer solution, the aqueous solution of the crosslinking agent, and the optional aqueous spacer fluid contains a buffering agent having a buffering capacity in a pH range of 4.5 to 5.5.

17. A process as claimed in claim 16 wherein the buffering agent is present in at least one of the aqueous polymer solution, the aqueous solution of the crosslinking agent, and the optional aqueous spacer fluid at a concentration in the range 0.01 to 1% by weight.

18. A process as claimed in claim 1 wherein the volumetric ratio of the aqueous polymer solution to the aqueous solution of the crosslinking agent is in the range 0.1:1 to 10:1.

19. A process as claimed in claim 1 wherein following the step b), a step c) is performed, step c) comprising shutting the well in for a period of between 4 hours and 1 week.

* * * * *